United States Patent [19]

Groth et al.

[11] Patent Number: 4,995,895

[45] Date of Patent: Feb. 26, 1991

[54] PROCESS FOR THE MANUFACTURE OF A TOUGHENED AND/OR BENT SHEET OF GLASS WITH A SILVER COATING

[75] Inventors: Rolf Groth, Bochum; Thomas Paul, Herne, both of Fed. Rep. of Germany

[73] Assignee: Flachglas Aktiengesellschaft, Bayern, Fed. Rep. of Germany

[21] Appl. No.: 431,700

[22] Filed: Nov. 3, 1989

Related U.S. Application Data

[63] Continuation of Ser. No. 167,655, Mar. 14, 1988, abandoned.

[51] Int. Cl.⁵ .................. C03C 17/36; C03B 23/023
[52] U.S. Cl. .................................. 65/60.2; 65/60.4; 65/60.5; 65/104; 65/106
[58] Field of Search ............... 65/60.2, 60.4, 60.5, 65/60.52, 60.51, 104, 106

[56] References Cited

U.S. PATENT DOCUMENTS

| | | | |
|---|---|---|---|
| 4,715,879 | 12/1987 | Schmitte et al. | 65/60.4 |
| 4,718,932 | 1/1988 | Pharms | 65/60.2 |
| 4,749,397 | 6/1988 | Chesworth et al. | 65/60.2 |

OTHER PUBLICATIONS

H. Gonde Dittmer, "Die Anwendung der Vakuumbeschichtungstechnik in der Glasindustry", Sprechsaal, vol. 119, No. 9, 1986, pp. 745-749, English Translation of Above Article.

Primary Examiner—Joye L. Woodard
Attorney, Agent, or Firm—Sughrue, Mion, Zinn, Macpeak & Seas

[57] ABSTRACT

Process for the manufacture of a toughened and/or bent, infrared-reflecting sheet of glass made of sodalime silicate glass, in which on at least side of a transparent glass base a silver coating is applied and on its side facing away from the glass base at least one anti-reflection coating made of metal oxide is applied and a thermal toughening and/or bending process at a temperature of 580° C. to 680° C., preferably 600° C. to 650° C., is carried out, characterised by the fact that a silver coating and an outer coating made of a metal or a metal alloy are applied onto the essentially flat glass base and by the fact that after this the toughening and/or bending process is carried out, in which the outer coating is converted with an increase in volume into an essentially absorption-free metal oxide, forming at least part of the anti-reflection coating, with an index of refraction $\geq 1.7$, sheet of glass produced according to this and its application.

17 Claims, 3 Drawing Sheets

PROCESS FOR THE MANUFACTURE OF A TOUGHENED AND/OR BENT SHEET OF GLASS WITH A SILVER COATING

This is a continuation of application Ser. No. 07/167,655, filed Mar. 14, 1988, now abandoned.

BACKGROUND OF THE INVENTION

1. Field of the Invention

The invention relates to a process for manufacturing a toughened and/or bent, infrared-reflecting sheet of glass made of sodalime silicate glass, in which on at least one side of a transparent glass base a silver coating and on its side facing away from the glass base at least one anti-reflection coating made of metal oxide are applied and a thermal toughening and/or bending process at a temperature of 580° C. to 680° C., preferably 600° C. to 650° C. is carried out, a sheet of glass produced according to this and its application.

2. Description of the Prior Art

Thin silver coatings are characterised by high light transmission in conjunction with high infrared-reflection and high electrical conductivity. For this reason, they have found many applications, for example for improving the thermal insulation of window panes and as a heated coating for windscreens in motor vehicles. The selective filtering properties of silver coatings can be further improved if on the side of the silver coating facing away from the glass base an anti-reflection coating made of a die-electric material is arranged, with an index of refraction $\geq 1.7$, for example a metal oxide coating. Furthermore, between the glass base and the silver coating a further di-electric coating can be provided, which acts as a bonding agent and if designed as a quarter-wavelength coating provides an additional anti-reflection effect. It also lies within the scope of the generic measures that the silver coating is embedded on both sides in each case one or several metal oxide coatings. Furthermore, between the glass base and the silver coating and the metal oxide coatings and the silver coating, metal, metal oxide or metal alloy coating, for example made of chrome, nickel, titanium, chromium nickel alloys, can be arranged, in order for example to improve the filtering properties, the adhesive strength and the resistance to corrosion (see DE-OS No. 21 44 242, DE-OS No. 33 07 661, DE-PS No. 33 16 548, EP-PS No. 35 906 and EP-OS No. 104 870).

In many cases of application, it is necessary to thermally toughen the glass base, for example to increase the mechanical stability, to avoid heat cracks and to reduce the risk of injury in the event of the glass sheet breaking. In order to create the thermal toughening, the sheets used almost exclusively in the applications referred to made of sodalime silicate glass are heated up quickly in air to a temperature above the transformation temperature of the glass and then tempered. The temperatures required for the toughening process lie in the region of 580° C. to 680° C., preferably 600° C. and 650° C. The same temperature range is also required if the glass sheets which are flat after glass production are subjected to a bending process, in order to obtain bent sheets of glass. Such glass sheets are particularly used as heated windscreens and rear lights when glazing motor vehicles. In connection with this, the glass sheet provided with an electrically conducting silver coating is bonded to another sheet of glass via a polyvinylbutyral film, whereby the coating is found on the side facing the lamination film, provided with the appropriate current conductor bars in the edge area of opposite sides for the feeding of the electrical energy for heating purposes. The application of the above-named coatings has until now regularly been carried out after concluding the toughening or bending process, whereby normally the vacuum coating process is used; it is admittedly known from DE-OS No. 36 28 057 that sheets of glass can be provided with a heat resistant pure metal coating system, in which an outer metal oxide coating is atomised non-reactively. For this purpose it is however necessary to use an oxide target for applying the outer metal oxide coating, which, alongside increased expenditure in the manufacture of the target, has the disadvantage of only relatively low sputtering rates. In addition, this process is associated with a deterioration in light transmission compared with generically produced silver coating systems.

The process of carrying out the coating after the toughening or bending process, as is usual with the generic process, has various disadvantages compared with a method in which initially the coating is applied and then the toughening or bending process is carried out. Thus in the first case, only cut sizes can be coated, as it is known that toughened glass sheets cannot be cut to size. For coating technology, it is on the other hand much more beneficial to coat unit sizes, in particular the machine widths from glass produced using the float process. In the latter case, the problem of a uniform coating thickness with vacuum coatings can be solved much more easily and simply than when cut sizes with corresponding gaps between the individual sheets in the coating field are coated. In addition, conveyance of such unit sizes through the coating system is less time-consuming than when individual pieces of various dimensions have to be conveyed.

A further disadvantage lies in the fact that as a result of the high temperatures of the toughening or bending process impurities on the surface of the glass frequently are bonded so firmly to it that in the subsequent surface cleaning before carrying out the coating process they cannot be removed to the extent that is necessary for the subsequent coating process. This leads to a troublesome deterioration in the coating quality.

In the case of coating bent sheets of glass, the problems of obtaining a sufficient uniformity in the coating are of course particularly great, because the angle and distance to the coating sources change additionally as a result of the curvature of the glass sheets. In addition, the cost of vacuum coating systems for coating bent sheets of glass are considerably higher than for the coating of flat sheets of glass, as input and output locks and locks between the various coating stations must be considerably wider than when coating flat glass.

For the reasons referred to, a procedure in which flat glass, in particular in the form of unit measures, is coated and then—in particular after producing the cut sizes by separation—is toughened or bent, has considerable advantages. This procedure is however impossible with coatings of the type described at the beginning, because troublesome changes in the coating would occur as a result of the heat stressing associated with the bending or toughening process. The sheets of glass receive a matt and in some cases spotted appearance. These changes in the coating lead to incident light being scattered. The scattered light level is in this case so intensive that it for example considerably impairs vision through such a sheet of glass, if this sheet is irradiated obliquely by sunlight and an observer looks through from the other side (milky sheet effect). In such conditions, there can be a troublesome impairment of vision through the sheet if only 1% of the solar radiation is diffusely scattered. Moreover, the coating loses in part its selective filtering properties. The light transmission, the infrared reflection capacity and the electrical conductivity deteriorate.

SUMMARY OF THE INVENTION

The invention therefore aims to further develop the generic process such that the disadvantages associated with coating the glass base only after the toughening or bending process are avoided and without the risk of changes in the coating the requisite coating measures can be carried out before the toughening and/or bending process, whereby the sheets of glass produced in this way are to have high light transmission, high reflection thermal radiation and high electrical conductivity. For usage as flat-heated automobile laminated glass sheets, sheets of glass produced in accordance with the invention should have particularly high light transmission, electrical conductivity and external reflection which is as low as possible. For usage in building glazings, the coating structure should moreover be designed as simply as possible.

In accordance with the invention, this task is solved in a further development of the generic process by the fact that on the essentially flat glass base at least one silver coating and an outer coating made of a metal or a metal alloy are applied and that afterwards the toughening and/or bending process is carried out, whereby the outer coating is converted into an essentially absorption-free metal oxide coating forming at least part of the anti-reflection coating with an index of refraction $\geq 1.7$ by increasing its volume.

BRIEF DESCRIPTION OF THE DRAWINGS

In the drawing, the numerals have the following significance: 10, glass base; 12, silver coating; 14, outer coating; 16 anti-reflecting coating; 17, adhesion coating; and 18, intermediate coating.

DESCRIPTION OF THE PREFERRED EMBODIMENTS(S)

Figure 1:
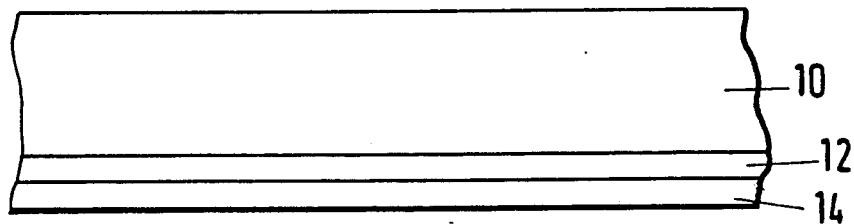
FIG. 1 shows an initial example of an embodiment of a sheet of glass which can be produced by the process in accordance with the invention in section vertical to the sheet plane.

The outer coating is preferably applied in a thickness of at least 5 nm.

In connection with this, it can be arranged that for the outer coating such a material is used that its index of refraction after oxidation is at least 2.0.

A further form of embodiment of the invention proposes that tan, zinc, cerium, zirconium, bismuth, hafnium, aluminium, indium, titanium, tantalum or allows of these metals are used as material for the outer coating.

In particular, it can be arranged that titanium, tantalum or allows of these metals are used as material for the outer coating.

The invention also proposes that before applying the outer coating, at least one intermediate coating of a thickness of at least 2 nm is applied onto the silver coating.

In connection with this, the procedure can be such that the intermediate coating is applied as a metal oxide coating.

The intermediate coating is applied preferably in a thickness of at least 8 nm and with an index of refraction $\geq 1.7$, so that together with the outer coating it acts as an anti-reflection coating.

A further form of embodiment of the invention provides that the anti-reflection coating adjoining the silver coating on the side facing away from the glass base is produced in a total thickness of—after oxidation—20 nm to 70 nm.

In can in particular be arranged in accordance with the invention that the anti-reflection coating adjoining the silver coating on the side facing away from the glass base be produced in a total thickness of—after oxidation—30 nm to 60 nm.

The invention proposes in addition that on the glass base before the application of the silver coating, at least one metal oxide anti-reflection coating is applied, preferably with a total thickness of 20 to 70 nm, in particular 30 to 60 nm.

The invention proposes preferably that the silver coating is applied in a thickness of 5 to 30 nm.

A further form of embodiment of the invention provides that at least one other metal, such as nickel, is added to the initial material for manufacturing the silver coating in small quantities, in order to improve the properties of the coating.

The process in accordance with the invention can also be characterised by the fact that on at least one side of the silver coating at least one thin additional coating made of a metal or a metal alloy improving adhesive strength is arranged.

As a further development of this form of embodiment, it can be arranged that chrome, nickel, titanium or alloys of these metals be used for the additional coating.

A particularly preferred form of embodiment of the invention provides that the coating of the glass base takes place by means of vacuum coating, in particular magnetron cathodic sputtering.

By means of the invention, a sheet of glass is also proposed which is produced in accordance with the claimed process.

The object of the invention is in addition the usage of a sheet of glass produced according to the process in accordance with the invention as an individual sheet in a laminated glass sheet, in particular for automotive glazings, with a coating adjacent to the lamination film, whereby the coating has at least one anti-reflection coating on the glass side, one silver coating and an outer anti-reflection coating made of a metal oxide intermediate coating and an outer coating made of $TiO_2$, $Ta_2O_5$ or mixtures of these oxides.

Finally, the usage of a single sheet of glass produced according to the process in accordance with the invention as an individual sheet in an insulating glass unit for building glazings is proposed, whereby the coating has at least one anti-reflection coating on the glass side, one silver coating and an outer anti-reflection coating made of $Ta_2O_5$.

Surprisingly, with the process in accordance with the invention it is possible to eliminate the troublesome changes in the coating which would otherwise occur. In connection with this, it has been shown that thickness of approximately 5 nm are sufficient for the effect of the outer metal or metal alloy coating.

The reasons for the stabilising effect of the outer metal or metal alloy coating changing during the bending/toughening process into an oxide coating are not known in detail. Tests under the microscope on a conventional coating system applied before the heat treatment have shown that after the toughening/bending process, the anti-reflection coating on the silver coating is broken up and has a cracked structure. This is possibly triggered off by an agglomerate formation of the silver coating taking place during the heat stressing. The reason for this may be the differing coefficients of expansion of the glass base and the silver coating. Differences in the coefficient of expansion of the glass base and the silver coating actually lead to compressive stresses in the silver coating and promote the agglomerate formation process. The effect of the outer metal or metal alloy coating could be explained as follows. The selection of the materials used for the outer coating is of decisive importance for the process in accordance with the invention: Only those metals are used in which the conversion taking place during toughening or bending into an essentially absorption-free oxide with an index of refraction $\geqq 1.7$ is associated with an increase in volume. Presumably, as a result of this increase in volume tensile stresses are induced in the silver coating, which counteract the compressive stresses referred to above. Surprisingly, the stabilising effect is still apparent even when the outer coating is not arranged directly on the silver coating, but with the interposition of further coatings. Reference should however be made to the fact that the explanation set out above is only an assumption. More detailed statements are of course not possible with such complicated interactions.

As already mentioned, it is appropriate in some cases to apply an intermediate coating between the silver coating and the outer coating. The function of such an intermediate coating, which should have a coating thickness of at least 2 nm, can be seen in preventing any diffusion of atoms from the outer metal or metal alloy coating into the silver coating and thus any undesirable formation of an alloy. Alongside this, a further improvement in the thermal resistance of the coating system can also be achieved. If the intermediate coating is produced as a metal oxide coating of a thickness of at least 8 nm approximately and with an index of refraction $\geqq 1.7$, then it, together with the appropriately thin outer coating, contributes to the anti-reflection effect of the silver coating. In this way, a further optimisation of the optical properties of the coating system is made possible, together with adaptation to given optical data, such as for example the colour effect of the sheet of glass produced in accordance with the invention.

The metals tin, zinc, cerium, zirconium, bismuth, hafnium, aluminum, indium, titanium, tantalum or alloys of these metals have proved in particular to be suitable for the outer metal or metal alloy coating. The metals titanium and tantalum and alloys of these metals are particularly preferred, the oxides of which have a high index of refraction above 2.2. This is particularly advantageous with applications in which the coated glass sheet is bonded by means of a polyvinylbutyral film with a second sheet of glass into a laminated glass unit. In this case, in contrast to other possible applications, the coating is not adjacent to air, but to the lamination film with the higher index of refraction 1.5, this means that a higher index of refraction is required for the anti-reflection coating, if optimum reduction in reflection is to be achieved. In such cases, coatings made of titanium and tantalum are particularly suitable on account of the high indices of refraction of the oxides formed during the bending or toughening process.

The total thickness of the anti-reflection coating arranged on the side of the silver coating facing away from the glass base depends upon the index of refraction of the materials used and in addition upon the wavelength range of the visible spectral range for which the anti-reflection coating is to be optimally adapted. The coating thickness required lie in the range 20 nm to 70 nm, preferably between 30 nm and 60 nm, based upon the coating thickness after oxidation of the outer coating, whereby it should be noted that the initial metal coating becomes thicker as a result of oxidation, generally by around a factor of 1.5 to 3.0. The possible anti-reflection coating on the glass side is preferably applied also in a thickness of 30 to 60 nm.

The thickness of the silver coating is dependent upon the values of the desired infrared reflection and the electrical conductivity. It lies in accordance with the invention in the range 5 to 30 nm. Other metals, such as for example nickel, which have a favourable effect on the coating formation process during manufacture, i.e. in particular further reduce the risk of the formation of agglomerates (see DE-OS Nos. 33 07 661 and 35 03 851), can be added to the initial materials for the silver coating in small quantities.

At this point, it is stressed that the process method in accordance with the invention has a particularly beneficial effect when manufacturing sheets of glass in which the silver coating is to be used for flat heating and in which it is a question of light transmission which is as high as possible. The process is therefore particularly suitable for manufacturing heated automotive windscreens. It has namely been observed that the electrical conductivity of the silver coatings increases notably as a result of heat treatment, i.e. by up to 100%. Sheets of glass produced in accordance with the invention therefore have considerably more favourable electrical data than sheets of glass produced in accordance with the state of the art, in which the externally identical coating system has only been applied after heat treatment. Vice-versa, it becomes possible by means of the process in accordance with the invention to adapt the same coating resistance with the aid of a considerably thinner silver coating, so that with the same heating output a higher degree of light transmission in the sheet of glass can be achieved.

The measure provided in the preferred form of the embodiment in the process in accordance with the invention, of arranging between the glass base and the silver coating or if necessary between the silver coating and the anti-reflection coating adjoining it on the side facing away from the glass base, thin metal or metal alloy coatings, in particular made of chrome, nickel, titanium or chrome nickel alloys, in order above all to improve the adhesion of the coating, is known in itself from DE-OS 21 44 242. Providing a thin metal coating or a metal oxide coating between the silver coating and the intermediate coating, in order to prevent damage to the silver coating as a result of reactive MAGNETRON sputtering, as is described in itself in EP-OS No. 104 870 or DE-PS No. 33 16 548, can in addition be beneficial.

Production of the coating in accordance with the invention preferably takes place by means of vacuum coating. In connection with this, the coatings can be applied by vaporisation from resistance-heated vaporisers or however by means of electron beam vaporisation. In addition, cathodic sputtering as a direct current or low frequency sputtering, is suitable, in particular however high frequency and MAGNETRON sputtering. The metal or metal alloy coatings can in connection with this either be produced by vaporisation or sputtering in a neutral atmosphere. For producing the oxide coatings, the reactive vaporisation process is suitable, in particular however the reactive sputtering process. In connection with this, the reactive MAGNETRON sputtering process is particularly economical, in which appropriate metal or metal alloy targets are sputtered in an atmosphere which includes oxygen.

The process in accordance with the invention, in which the outer coating is converted during toughening or bending into the appropriate metal oxide coating, brings considerable advantages also from the process point of view in the case of vacuum coatings compared with the generic process, in which the appropriate oxide coating is produced directly. With the vacuum coating process, the cost of producing an oxide coating is considerably higher than for producing a metal coating. Thus with the particularly economic MAGNETRON sputtering process, the sputtering rates for metal coatings are much higher than those for oxide coatings in the case of reactive sputtering of the relevant metal target. These rates differ for example in the case of titanium dioxide by more than a power of ten. Also the problems of obtaining a uniform coating on large surfaces are easier to solve when producing metal coatings than metal oxide coatings.

Finally, it is noted that the optical properties of sheets of glass produced in accordance with the invention can be further optimised by using mass-tinted glasses. For example, automotive glazings are frequently made of green glass on all sides for solar control reasons. In order to achieve a uniform overall optical impression, it is preferred for such a case when using sheets of glass produced in accordance with the invention as part of the windscreen, to also make this in green glass. The external reflection is thereby further reduced, as a desirable auxiliary effect.

Figure 2:
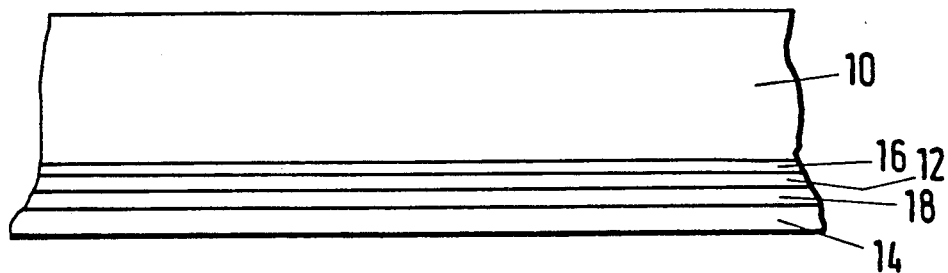
FIG. 2 shows an example of an embodiment altered compared with FIG. 1, also in section vertical to the sheet plane.
Figure 3:
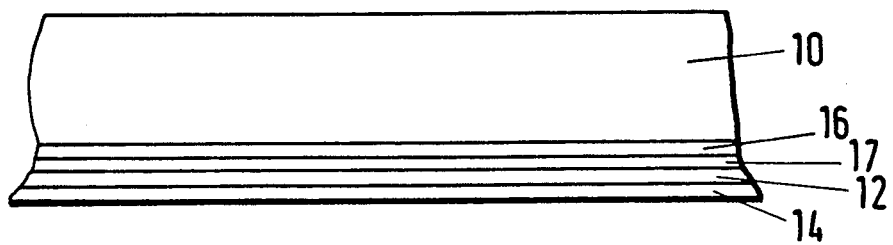
FIG. 3 shows an example of an embodiment of a sheet of glass, further altered compared with FIGS. 1 and 2, in section vertical to the sheet plane.
Figure 4:
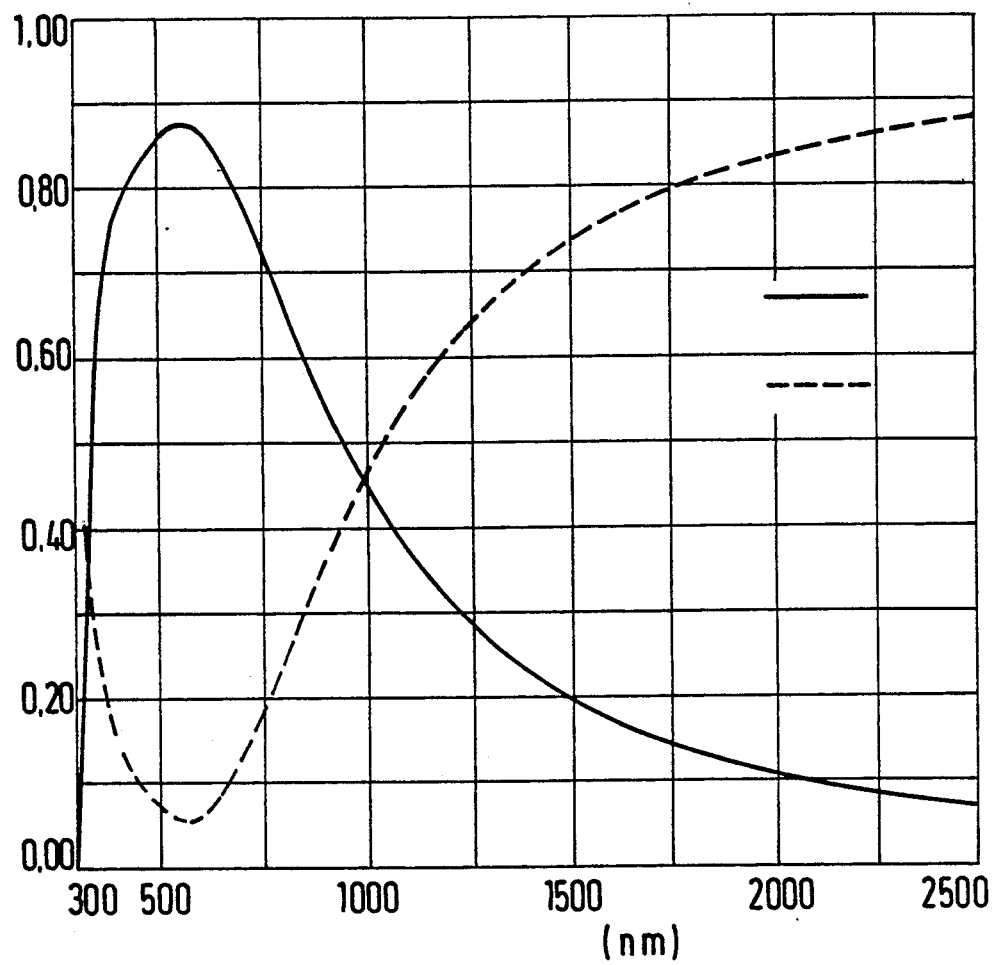
FIG. 4 shows the transmission and reflection graphs of a sheet of glass produced in accordance with Example I.

Further features and advantages of the invention are apparent from the description below, in which examples of embodiment are explained in detail on the basis of the diagrams. The following are shown:

FIG. 1—an initial example of embodiment of a sheet of glass which can be produced by the process in accordance with the invention in section vertical to the sheet plane;

FIG. 2—an example of embodiment altered compared with FIG. 1, also in section vertical to the sheet plane;

FIG. 3—an example of embodiment of a sheet of glass, further altered compared with FIGS. 1 and 2, in section vertical to the sheet plane;

FIG. 4—the transmission and reflection graphs of a sheet of glass produced in accordance with Example I.

In the example of embodiment in accordance with FIG. 1, a silver coating 12 and a tantalum oxide coating 14 (out coating) produced by oxidation in the toughening and/or bending process are arranged successively on a glass base 10.

In the example of embodiment in FIG. 2, an anti-reflection coating 16 made of $SnO_2$ is situated between the glass base 10 and the silver coating 12. On the side facing away from the glass base 10, adjoining the silver coating 12 is an intermediate coating 18 made of Sn-doped $In_2O_3$, followed by the outer coating 14, which is produced in this case by the oxidation of $TiO_2$ produced from titanium.

In the example of embodiment in FIG. 3, following on from the glass base 10, there is initially an anti-reflection coating 16 made of $SnO_2$, then an adhesive coating 17 made of Sn-doped $In_2O_3$, then the silver coating 12 and then adjoining this the outer coating 14, in this case made of oxidised tantalum ($Ta_2O_5$).

EXAMPLE I

In a vacuum coating system, which had been fitted with coating device for MAGNETRON sputtering, the following coatings were applied in sequence onto a sheet of float glass measuring 40 cm × 40 cm and 4 mm thick:

an $In_2O_3$ coating doped with tin, 32 nm thick, by means of reactive sputtering on a target of the composition In (90) Sn(10) at a pressure of $3.5 \cdot 10^{-3}$ mbar in an argon-oxygen-nitrogen atmosphere with 40% by volume oxygen and 30% by volume nitrogen.

a silver coating, 9 nm thick, by means of sputtering of a silver target in an argon atmosphere at a pressure of $2.5 \cdot 10^{-3}$ mbar a tantalum coating, 14 nm thick, by means of sputtering of a tantalum target in an argon atmosphere at a pressure of $1.3 \cdot 10^{-3}$ mbar.

The sheet of glass coated in this way had a degree of transmission in the range of high eye sensitivity around 550 nm of 0.25. It was then heated up in a metal box in a furnace in air to 620° C. and after removing the box from the furnace cooled down quickly. The heat treatment corresponded more or less to the conditions which occur during toughening and bending.

After this heat treatment, the degree of transmission in the range around 550 nm had increased to 0.87 as a result of the oxidation of the tantalum coating. The coated sheet did not have any noticeable spotting and did not show any disturbing scattered light when illuminated with a projection lamp. The results of the spectral measurement in transmission and reflection are shown in FIG. 4. The transmission maximum lies in the range of high eye sensitivity around 550 nm. At longer wavelengths, the transmission falls and in the near infrared is very low. The reflection graph shows the reverse development. Generally, very good filtering properties are obtained.

COUNTER EXAMPLE I a

The process as under Example I was carried out when applying the coating with the difference that instead of the tantalum coating, a $Ta_2O_5$ coating, 32 nm thick, was applied. This was carried out by means of reactive sputtering of a tantalum target at a pressure of $1.6 \cdot 10^{-3}$ mbar in an argon-oxygen atmosphere with 25% by volume oxygen. The coated sheet did not have any scattered light and had a degree of transmission in the range of high eye sensitivity around 550 nm of 0.86.

It was then subjected to the same heating cycle as in Example I. Following this, the sheet had a high degree of scattered light when illuminated with a projection lamp. It was not suitable for the applications referred to.

EXAMPLE II

In the same vacuum coating system as in Example I, the following coatings were applied in sequence onto a sheet of float glass measuring 40 cm × 40 cm and having a thickness of 2 mm:

an $SnO_2$ coating, 30 nm thick, by means of reactive sputtering of a tin target at a pressure of $4\cdot30^{-3}$ mbar in an argon-oxygen atmosphere with 50% by volume oxygen an $In_2O_3$ coating doped with tin of a thickness of 3.5 nm by means of sputtering of a target of the composition In (90) Sn (10) at a pressure of $3.5 \cdot 10^{-3}$ mbar in an argon-oxygen atmosphere with 40% by volume oxygen a silver coating, 9 nm thick, by means of sputtering of a silver target in an argon atmosphere at a pressure of $2.5 \cdot 10^{-3}$ mbar an $In_2O_3$ coating doped with thin of a thickness of 2 mm by means of sputtering of an In (90) Sn (10) target in an argon-oxygen atmosphere with 20% by volume oxygen at a pressure of $1.5 \, 10^{-3}$ mbar a titanium coating, 17 nm thick, by means of sputtering of a titanium target in an argon atmosphere at a pressure of $1.5\cdot10^{-3}$ mbar The sheet coated in this way had a degree of transmission of 0.30 at a wavelength of 550 nm. The coated sheet was then subjected to the same temperature cycle as in Example I. It did not show any noticeable spotting following this. The degree of transmission at 550 nm was 0.86.

The latter sheet was bonded to a second sheet of float glass of a thickness of 2 mm into a laminated glass sheet by means of a polyvinylbutyral film, 0.76 mm thick, in such a way that the coated side of the first sheet of float glass was facing the lamination film.

Figure 5:
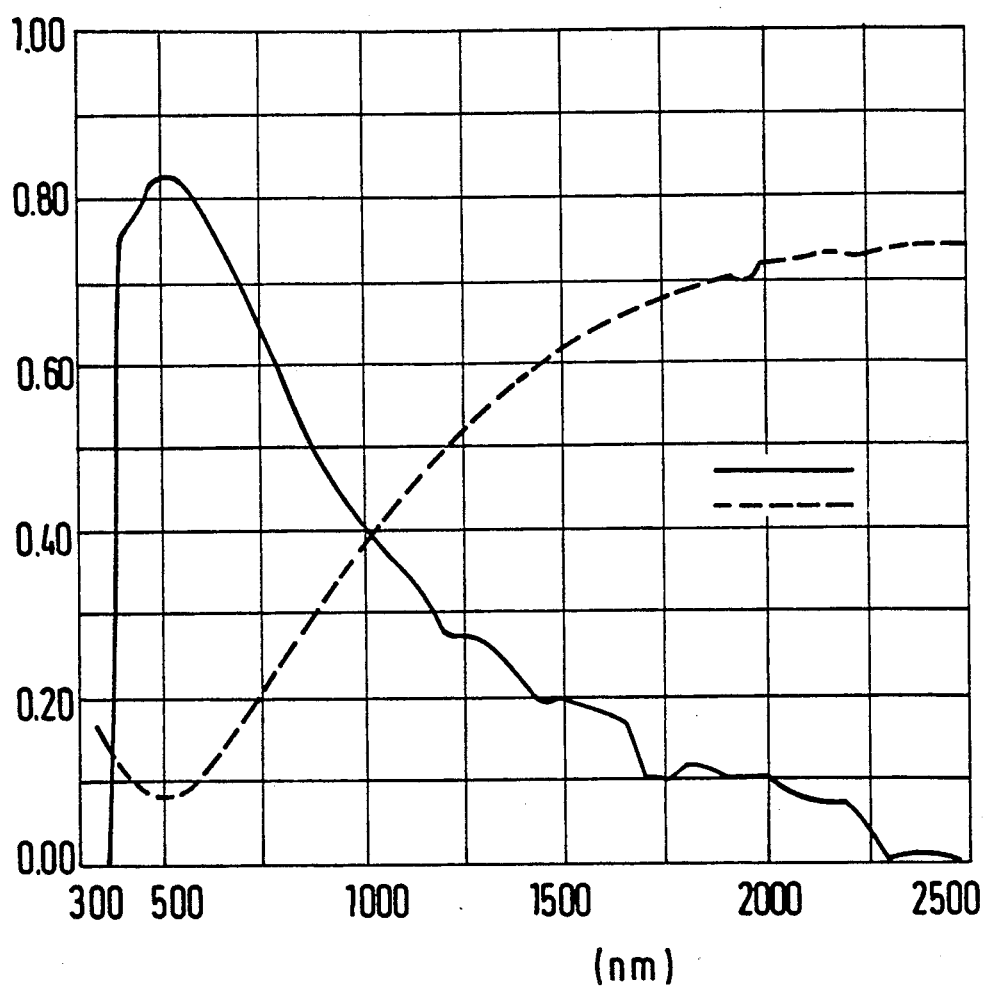
FIG. 5 shows the transmission and reflection graphs of a sheet of glass produced in accordance with Example II.

The results of the spectral measurement of transmission and reflection of the laminated glass sheet are shown in FIG. 5. In the range of high eye sensitivity around 550 nm, a degree of transmission of 0.82 is achieved. At long wavelengths, the transmission falls continuously and is very low in the near infrared. The reflection graph shows the reverse development, in particular the degree of reflection in the range of high eye sensitivity is very small, at 0.08. Such a laminated glass sheet is extremely suitable above all for automotive applications such as heated windscreens.

COUNTER EXAMPLE II a

The process for applying the coating was carried out as in Example II, with the difference that instead of the titanium coating a 30 nm $TiO_3$ coating was applied: This took place by means of reactive sputtering of a titanium target at a pressure of $2\cdot10^{-3}$ mbar in an argon-oxygen atmosphere with 40% by volume oxygen. The coated sheet had a degree of transmission in the range around 550 nm of 0.85 and did not have any disturbing clouding phenomena. It was then subjected to the same temperature cycle as the sheet in Example I. After this, the sheet had a spotted appearance and after it had been processed into a laminated glass sheet as in Example II, had a high proportion of scattered light when illuminated with a projection lamp.

The characteristics of the invention revealed in the above description, in the drawing and in the claims and is fundamental both individually as well as in any given combination for realising the invention in the various forms of embodiment.

We claim:

1. A process for the production of a toughened and/or bent infrared-reflecting sheet of soda lime silicate glass, comprising the steps of:

applying a silver layer on at least one side of an essentially flat glass base;

arranging a metal or metal alloy outer layer outside the silver layer on the side facing away from the glass base, such metal or metal alloy layer being the outermost layer of the total layers applied to the glass base even in such cases in which other layers in addition to the silver layer and the metal or metal alloy layer are applied to the glass base, the metal or metal alloy layer being in direct contact with a surrounding oxygen-containing atmosphere during a toughening and/or bending process; and carrying out the toughening and/or bending process at a temperature of from 580° C. to 680° C., whereby the outer metal or metal alloy layer is converted with an increase in volume into an essentially absorption-free metal oxide layer, forming an outermost anti-reflection layer with an index refraction of $\geqq 1.7$, or at least forming an outermost layer of a composite anti-reflection layer which includes the outermost anti-reflection layer as the outermost layer.

2. A process according to claim 1, wherein the outer metal or metal alloy layer comprises a material selected from the group consisting of tin, zinc, cerium, zirconium, bismuth, hafnium, aluminum, indium, titanium, tantalum and alloys thereof.

3. A process according to claim 2, wherein said outer metal or metal alloy layer has an index of refraction after oxidation of at least 2.0.

4. A process according to claim 3, wherein said outer metal or metal alloy layer comprises a material selected from the group consisting of titanium, tantalum and alloys thereof.

5. A process according to claim 2, wherein said outer metal or metal alloy layer is applied in a thickness of at least 5 nm.

6. A process according to claim 1, further comprising the step of:

applying at least one intermediate layer in a thickness of at least 2 nm onto said silver layer prior to the application of said outer metal or metal alloy layer.

7. A process according to claim 6, wherein said intermediate layer is applied as a metal oxide layer.

8. A process according to claim 7, wherein said intermediate layer is applied in a thickness of at least 8 nm and has an index of refraction of $\geqq 1.7$, whereby said intermediate layer together with said outer metal or metal alloy layer acts as anti-reflection layer after oxidation.

9. A process according to claim 8, wherein said anti-reflection layer adjoining the silver layer on the side facing away from the glass base is produced in a total thickness of 20 nm to 70 nm, after oxidation.

10. A process according to claim 7, further comprising applying at least one second metal oxide anti-reflection layer having an index of refraction of $\geqq 1.7$, and a total thickness of 20–70 nm, onto said glass base prior to the application of said silver layer.

11. A process according to claim 1 wherein said silver layer is applied in a thickness of 5–30 nm.

12. A process according to claim 11, wherein at least one other metal is added to the initial material for producing the silver layer in small quantities in order to improve the coating properties.

13. A process according to claim 12, wherein said other metal comprises nickel.

14. A process according to claim 1, further comprising applying a thin additional layer comprising a metal or metal alloy to improve adhesive strength, onto at least one side of said silver layer.

15. A process according to claim 14, wherein said additional layer comprises a material selected from the group consisting of chromium, nickel, titanium and alloys thereof.

16. A process according to claim 1, wherein the layer application of the glass base is carried out by vacuum coating.

17. A process according to claim 16, wherein said vacuum coating process comprises a magnetron cathodic sputtering.

* * * * *